(12) United States Patent
Burroughs et al.

(10) Patent No.: US 6,810,617 B1
(45) Date of Patent: Nov. 2, 2004

(54) LIVEWELL TANK

(75) Inventors: Ken Burroughs, Ozark, MO (US); Tommy Morphis, Springfield, MO (US)

(73) Assignee: Tracker Marine, L.L.C., Springfield, MO (US)

(*) Notice: Subject to any disclaimer, the term of this patent is extended or adjusted under 35 U.S.C. 154(b) by 0 days.

(21) Appl. No.: 09/451,341

(22) Filed: Nov. 30, 1999

(51) Int. Cl.[7] ............................................. A01K 97/00
(52) U.S. Cl. ............................................. 43/55; 43/56
(58) Field of Search .................. 43/55, 56; 206/315.11; 114/255, 364

(56) References Cited

U.S. PATENT DOCUMENTS

| | | | | |
|---|---|---|---|---|
| 372,233 A | * | 10/1887 | Northrop | 43/56 |
| 521,244 A | * | 6/1894 | Muncaster | 43/56 |
| 1,587,785 A | * | 9/1926 | Marsh et al. | 43/56 |
| 2,761,239 A | * | 9/1956 | Stamps | 43/56 |
| 2,853,828 A | * | 9/1958 | Fisher | 43/56 |
| 2,966,002 A | * | 12/1960 | Hobson et al. | 43/55 |
| 2,968,887 A | * | 1/1961 | Woolworth | 43/56 |
| 3,000,132 A | * | 9/1961 | Koistinen | 43/56 |
| 3,315,402 A | * | 4/1967 | Scott et al. | 43/55 |
| 3,334,438 A | * | 8/1967 | Fellers | 43/56 |
| 3,452,469 A | * | 7/1969 | White | 43/55 |
| 3,553,880 A | * | 1/1971 | Splickan | 43/55 |
| 3,903,636 A | * | 9/1975 | Bracey | 43/56 |
| 3,955,306 A | * | 5/1976 | Handa | 43/56 |
| 3,958,289 A | * | 5/1976 | Carlson | 114/255 |
| 4,000,577 A | * | 1/1977 | Kelley | 43/55 |
| 4,019,274 A | * | 4/1977 | Landell et al. | 43/55 |
| 4,970,982 A | | 11/1990 | Martin | 114/255 |
| 5,010,836 A | | 4/1991 | Riviezzo | 114/255 |
| 5,050,526 A | * | 9/1991 | Nelson et al. | 114/364 |
| 5,123,198 A | * | 6/1992 | Grossmann | 43/55 |

* cited by examiner

*Primary Examiner*—Kurt Rowan
(74) *Attorney, Agent, or Firm*—Shook, Hardy & Bacon LLP

(57) ABSTRACT

A livewell tank for use on a boat is provided having a bottom and a sidewall section forming an interior compartment. A top is coupled with the sidewall section and extends inwardly to cover the interior compartment about the periphery of the sidewall section. An overflow drain is located proximate the top of the tank and a baffle inhibiting turbulent flow is positioned between the overflow drain and the bottom of the tank.

3 Claims, 2 Drawing Sheets

LIVEWELL TANK

CROSS-REFERENCE TO RELATED APPLICATIONS

"Not Applicable"

STATEMENT REGARDING FEDERALLY SPONSORED RESEARCH OR DEVELOPMENT

"Not Applicable"

BACKGROUND OF THE INVENTION

The present invention relates to livewell for use on a boat to hold fish and more particularly to a livewell tank for preventing sloshing in the tank to protect the well being of the fish held within the livewell tank.

In fishing tournaments, fish are commonly caught and maintained in a live condition and released back into the lake once the fish have been weighed, photographed and the like. For this and a number of other reasons, many fishing boats are provided with livewells for maintaining fish in good living condition for extended periods of time.

Livewells generally include a livewell tank of sufficient size to retain a number of fish. Typically, the tank is coupled with at least one pump drawing water from the surrounding lake into the tank. At the inlet of the tube pumping water to the livewell tank, an air supply tube may be fitted with the inlet tube to mix air with the incoming water to provide oxygen to the fish within the tank. Additional pumps may be used in case the initial pump fails or to provide a recirculation circuit to aerate the water in the tank when fresh water is not being pulled into the tank. Conventional valves and controls are used to control the function of each pump and control whether fresh water is being pulled from the lake, recirculation is occurring, or both.

Typically, livewell tanks are only partially filled with water in operation for a number of reasons such as preventing water from flowing outwardly from tanks through an outflow drain or over the sides of the tank as the boat moves. However, the unfilled space at the top of the livewell tank creates a number of problems. Primarily, when the boat is moving, the empty space in the tank leads to water turbulence in the tank. The water tends to slosh about within and buffet against the sidewalls of the tank. Consequently, the fish within the tank are forced in motion along flow of the water and, at times, strike against the walls of the tank. This instability places the well being of the fish in danger and leads to diminished survival rates.

BRIEF SUMMARY OF THE INVENTION

It is an object of the present invention to provide a livewell tank for preventing water within the livewell tank from adversely affecting the fish within the livewell when the boat is in motion.

In accordance with the foregoing and other objects evident from the following description of a preferred embodiment of the invention, a livewell is provided which includes a bottom, a sidewall section, a top and an overflow drain. The sidewall section is coupled with and upstanding from the bottom at a first end to define an interior compartment. At a second end of the sidewall section, a peripheral edge is presented. The top is coupled with the second end of the sidewalls section and has on opening for receiving fish. The top includes a first surface projecting inwardly from the peripheral edge of the sidewall section a portion of the interior compartment. The overflow drain is coupled with the sidewall section proximate the top of the tank.

In another aspect, the livewell tank of the present invention includes a bottom, a sidewall section, a top and a baffle. The sidewall section is coupled with and upstanding from the bottom at a first end to define an interior compartment. At a second end of the sidewall section, a peripheral edge is presented. The top is coupled with the second end of the sidewalls section and has on opening for receiving fish. The top includes a first surface projecting inwardly from the peripheral edge of the sidewall section a portion of the interior compartment. The baffle is coupled with the sidewall section and extends inwardly into the interior compartment.

By providing a livewell tank capable of operating with a full or nearly full volume of water in accordance with the present invention, numerous advantages are achieved. First, the water within the tank does not exit through the overflow drain or over the top of the sidewalls of the well and onto the deck of the boat. The elimination of the space at the top of the tank reduces the turbulent flow within the tank and the sloshing and buffeting of the water associated with the turbulence. Second, the fish are maintained in a relatively stable system of water that is more suitable to maintaining the well being of the fish and increasing the likelihood that the fish will survive their time in the livewell. Third, the livewell of the present invention may be incorporated with conventional pump systems and integrated within the conventional boat decks.

BRIEF DESCRIPTION OF THE SEVERAL VIEWS OF THE DRAWING

The objects and features of the invention noted above are explained in more detail with reference to the preferred embodiment illustrated in the attached drawing figures, in which like reference numerals denote like elements, and in which.

DETAILED DESCRIPTION OF THE INVENTION

Figure 1:
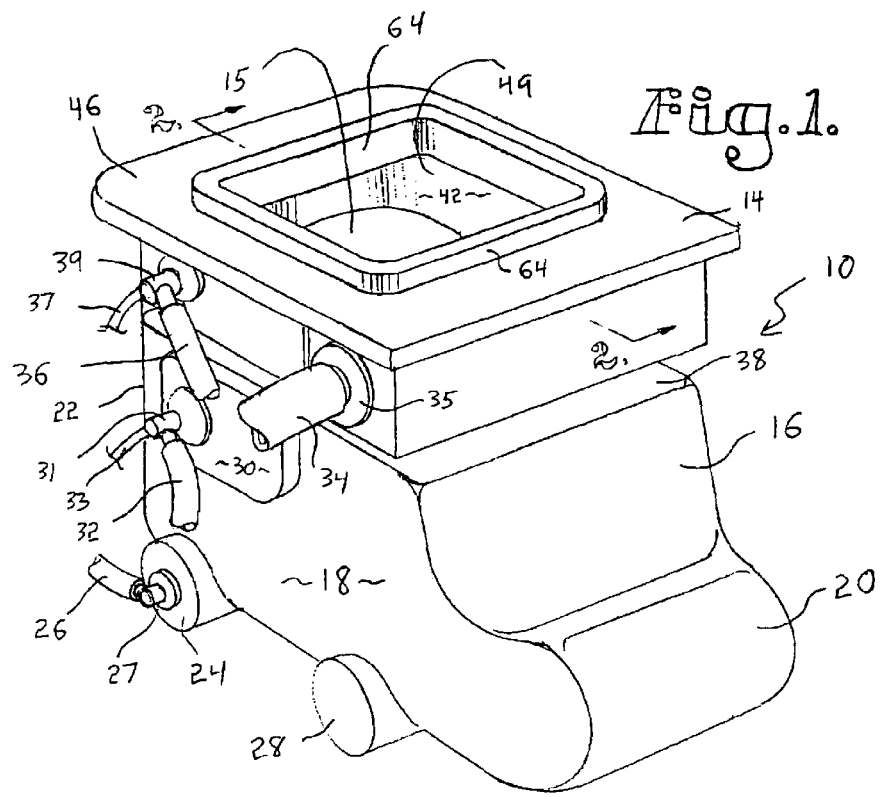
FIG. 1 is a perspective view of a livewell tank according to the present invention.

Referring to the drawing figures in greater detail, and initially to FIG. 1, an exemplary livewell tank designated by reference numeral 10 is shown.

Figure 2:
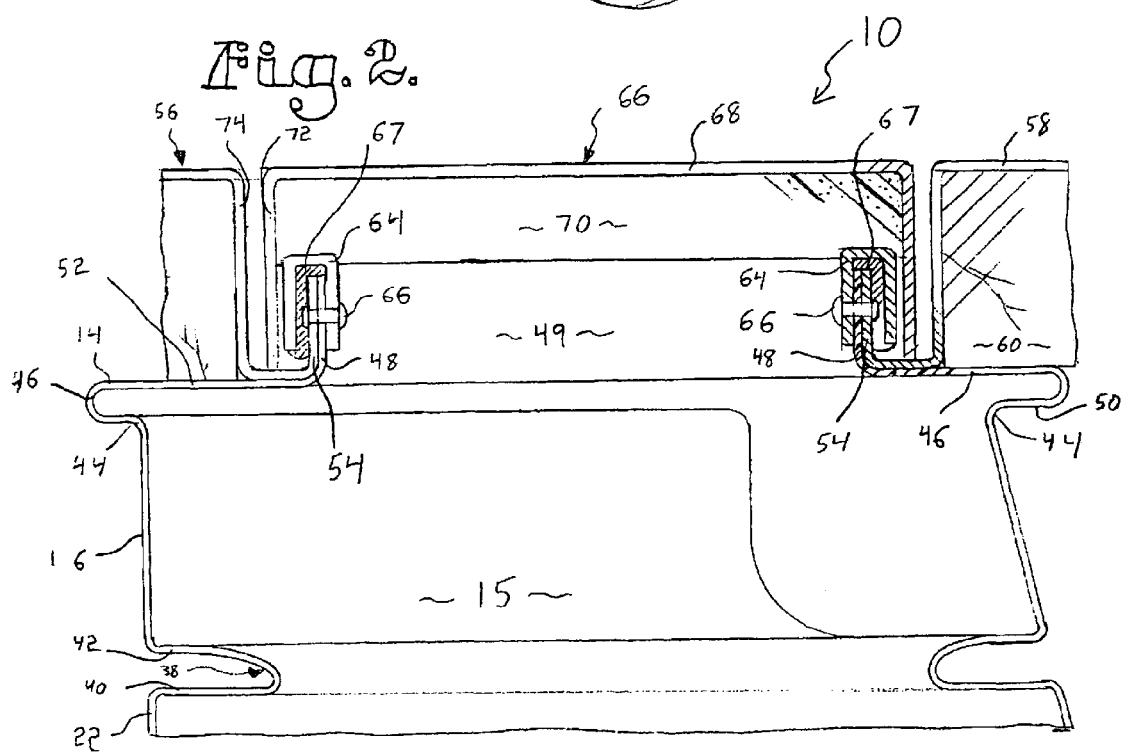
FIG. 2 is a fragmentary, horizontal cross sectional view of livewell tank of FIG. 2 illustrating the livewell assembled with the deck of the boat.
Figure 3:
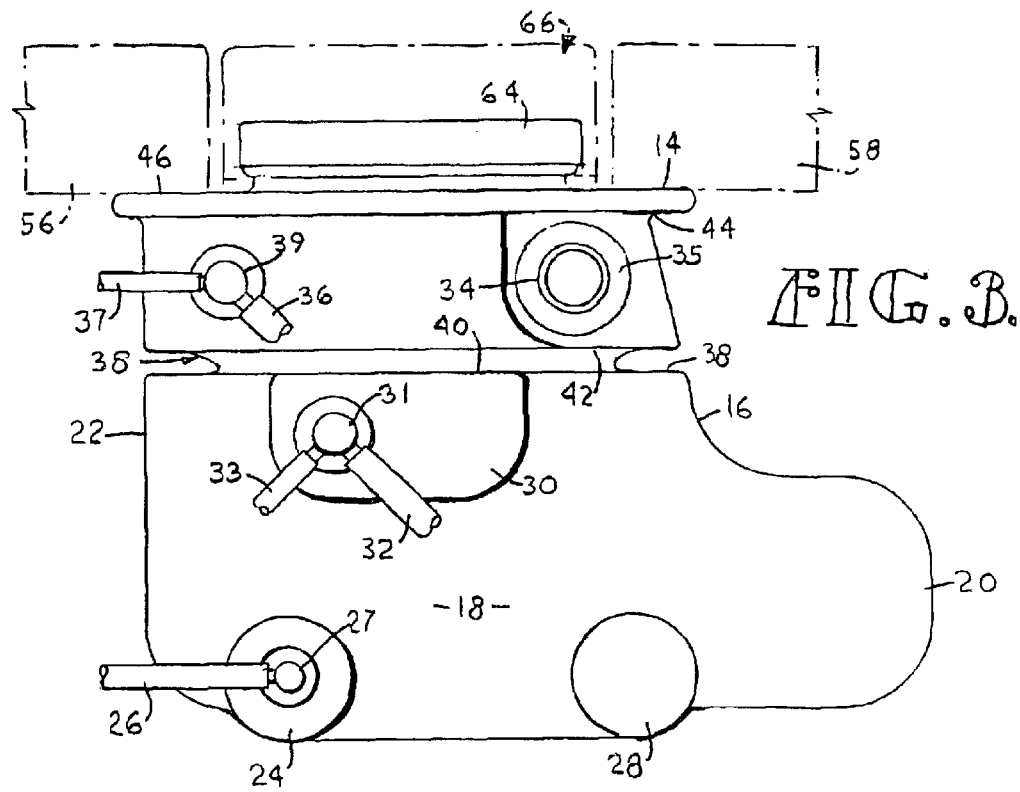
FIG. 3 is a front elevational view of the livewell tank of FIG. 2 with the hatch and boat deck shown in phantom lines.
Figure 4:
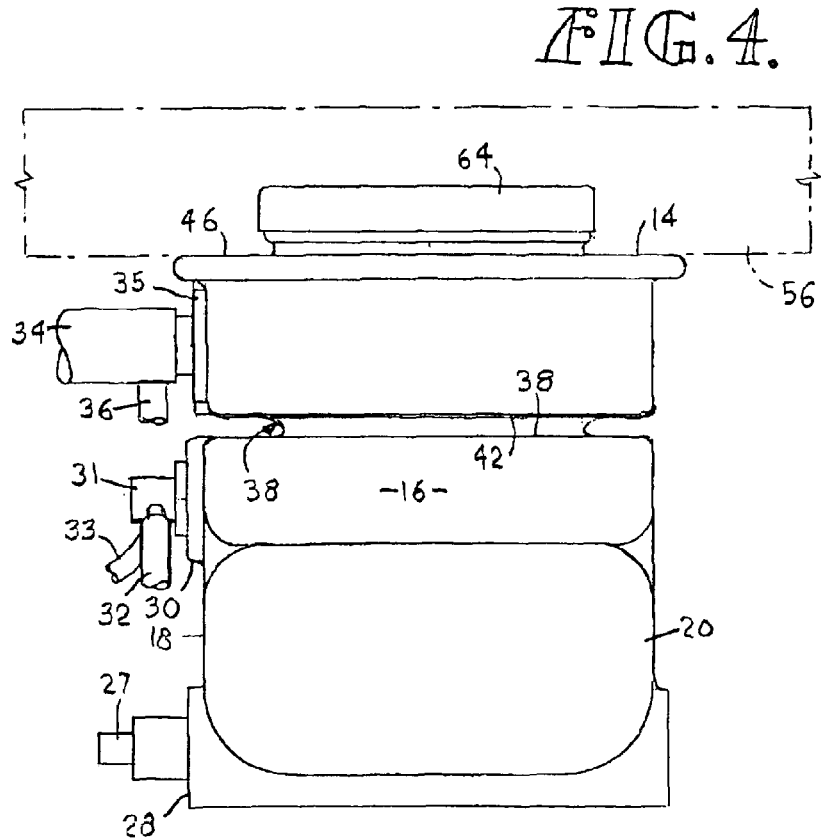
FIG. 4 is a side elevational view of the livewell tank of FIG. 3 with the hatch and boat deck shown in phantom lines.

With reference to FIGS. 1 and 2, livewell tank 10 has a bottom 12, a top 14, and a sidewall section 16 extending between the bottom 12 and top 14 to define an interior compartment 15 for holding water. In a preferred embodiment, the tank is integrally molded from a durable plastic material such as a low weight polyethylene.

Bottom 12 is generally planar and typically rests on the hull of the boat or a lower wall of a box enclosing the livewell tank. Sidewall section 16 extends upwardly from bottom 12. Sidewall section includes a generally planar front wall 18. On one side of front wall 18, an outwardly extending portion 20 is located and a generally planar side wall 22 is located on the opposing side of front wall 18. In the preferred embodiment, the cross sectional profile of the sidewall section 16 is generally constant from the front to back of the tank and the back wall is generally planar.

Front wall 18 is directed toward the bow, or forward part, of the boat when the livewell is placed within the boat and secured to the deck as described below. A first cylindrical extension 24 is located near the base of front wall 18. A first recirculation hose 26 is secured to a fitting 27 in communication with the interior compartment. A second cylindrical extension 28 is located near the base of front wall 18 opposite first extension 24. A lower drain hose (not shown) may be coupled with this extension if desired.

At a position preferably above the center of front wall 18, a third fitting extension 30 is defined. A water supply hose 32 is coupled with livewell 10 at a fitting 31 in communication with the interior of the compartment. A pump pulls water through an inlet located on the exterior hull of the boat below the water level and provides water through hose 32. An air supply hose 33 is secured to hose 32 near front wall 18 to intermix oxygen with the incoming water to aerate the water within the livewell. Hose 32 may be coupled with recirculation hose 26 through a series of controllable valves to create a recirculation circuit as understood in the field of livewells.

Near the top of front wall 18, an overflow drain hose 34 extends from the tank at a fitting 35. In the preferred embodiment, the aperture through fitting 35 is in close proximity to the top 14 of livewell 10. On the opposite side of front wall 18, a second water supply hose 36 is coupled with the livewell at a fitting 39. A second pump in communication with the water surrounding the boat supplies water through hose 36. As water is pulled through hose 36, air is introduce through air supply hose 37 coupled with fitting 35.

The outwardly extending portion 20 of sidewall section has a generally semicircular cross section at the terminal end. The shape of portion 20 and position near bottom 12 defines a wide area for fish to maneuver near the base of livewell 10. Preferably, the elongated distance of the well from the end of portion 20 to the opposing sidewall is about two feet, and is most preferably about twenty-five inches. The preferred height of the tank from top to bottom is about one and a half feet. However, the shape and dimensions of the side wall section may vary without departing from the scope of the present invention.

A baffle 38 is formed about the periphery of sidewall section 16 below top 14 and overflow hose 34. Preferably, baffle 38 extends completely around the sidewall section 16 and includes a flat, lower surface 40 and an upper, curved surface 42 defining an baffle space therebetween. For a tank having a height of about one and a half feet, upper surface 42 of baffle 38 is located about five inches from top 14 and extends a distance of about two to three inches into the interior of the tank compartment. Alternatively, the baffle may be formed by other structures extending into the interior of the tank such as a single surface or ledge. Moreover, the baffle may extend about a portion rather than the entirety of the sidewall section of the livewell.

Top 14 is secured to the upper edge of sidewall section 16 and includes a mounting flange 46 and a upwardly extending sealing flange 48. Mounting flange 46 is defined by a lower ledge surface 50 projecting outwardly from the top of sidewall section 46 and an upper surface 52 projecting inwardly with respect to the sidewall section 16. Thus, the upper surface covers the interior compartment about the upper peripheral edge of the sidewall section. In a preferred embodiment, the upper surface extends inwardly into the compartment about the entire upper peripheral edge of the sidewall section at a distance of about two inches inside of the upper peripheral edge 44 of top of sidewall section 16. The upper surface 52 is preferably about three to four inches in length from the bend in the mounting flange 46 to the sealing flange 48.

Sealing flange 48 is preferably formed normally with respect to upper surface 52 and defines a central opening 49 for ingress and egress of fish from the water within the tank compartment. In a preferred embodiment, opening 49 is generally rectangular, but may vary particularly, for instance, depending on the shape of the sidewall section.

With reference to FIG. 2, the mounting flange 46 and sealing flange 48 are shown in relation with to boat deck 56. Deck 56 includes an upper layer 58, preferably formed from aluminum, and a lower layer 60, preferably formed from wood. Upper layer 58 has an engaging surface 54 defining an opening slightly larger than opening 49 and corresponding closely in shape to opening 49. To assemble livewell 10 within deck 56, the rectangular sealing flange 48 is placed within the opening defined by engaging surface 54.

Once in position, engaging surface 54 is in contact with flange 48. Likewise, lower layer 60 of the boat deck 56 contacts upper surface 52 of mounting ledge 46. Upper surface 52 of mounting flange 46 may be secured the deck surface 54 by mechanical fastening means, adhesives, or other fastening methods. For example, for fiberglass boat decks, the mounting flange of the livewell could be secured to the fiberglass deck surface underlying the fiberglass and a laminate applied over the surfaces of the livewell.

As illustrated in FIGS. 1 and 2, a collar 64 is placed over ring 48 and the corresponding portion of upper layer 58. Collar 64 is sized to received the corresponding sealing flange 48 and deck surface 48. The collar is preferably made from a resilient plastic material and is mechanical secured to the ring and deck surface by at least one rivets 64 as shown in FIG. 2. Preferably, a layer of caulk 67 is placed at common surfaces of collar 64, sealing flange 48 and the corresponding engaging surface 54 of the deck to insure a watertight seal.

As seen in FIG. 2, a closeable hatch 66 may overlays the collar 64 to cover opening 49. Hatch 66 has an upper layer 68 preferably formed from aluminum and a lower layer 70 preferably formed from a material such as foam or foam rubber. The hatch is rotatable mounted at a one of side of the livewell as conventional in the art. When hatch 66 is pivoted into proximity with livewell 10, a seal is formed between the lower layer 70 and collar 64. Likewise, a downwardly extending flange 72 of upper layer 68 is received within a recess area 74 of the deck surrounding the livewell. A releasable mechanical fastening means (not shown) such as a latch may be used to force the hatch and collar into connection with one another.

In operation, water is supplied to the livewell through water supply hoses 32 and/or 34 by pumps conventional in livewell devices. The water level is maintain throughout almost the entirety of the tank due to the location of overflow hose 34 near the top of the sidewall section 16. When the boat is placed in forward motion, the stern (or rear) of the boat lowers into the water and livewell 10 is similar tipped from a generally horizontal orientation. Due to the change in orientation and the acceleration of the boat in the forward direction, water in the well tends to move rearwardly with respect to front sidewall 18. The placement of the overflow drain fitting and hose 34 at the front of the livewell prevents these forces from forcing water out of the tank and creating the harmful effects of turbulence. Baffle 38 and lower ledge 50 further prevent disruptive flow within the livewell tank. Any water with the tank that reaches opening 49 despite these measures is prevented from exiting the tank due to the sealing flange 48 and watertight connection between hatch 66 and collar 64. The same preventive measures alone and in combination tend to prevent disruptive flow from developing as the boat cruises and when the boats slows and tends to return to a level plane.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. A live well tank for use on a boat to hold water and fish, said tank comprising:

a bottom;

a sidewall section having first and second opposing ends, said sidewall section coupled with said bottom at said first end to define an interior compartment, and said sidewall section having an outwardly extending portion proximal to the bottom;

a top coupled with said second end of said sidewall section, said top forming an opening sized for receiving a fish, said top having an upper surface projecting inwardly from said sidewall section to cover a portion of said interior compartment;

a baffle coupled with said sidewall section having first and second surfaces, said first surface of said baffle extending generally horizontally from said sidewall section inwardly into said interior compartment, said second surface of said baffle extending outwardly toward said sidewall section to form an upper region of said interior compartment between said baffle and said top; and an overflow drain coupled with said sidewall section of said tank between said top and said baffle whereby said upper section is capable of retaining water near said top of said compartment regardless of the movement of the boat so that sloshing within the compartment is minimized.

2. The livewell tank of claim 1, wherein said outwardly extending portion is generally semicircular in cross section at a terminal end thereof.

3. The livewell tank of claim 1, wherein said first surface of said baffle has a portion parallel to a portion of said second surface of said baffle.

\* \* \* \* \*